United States Patent [19]

Klier et al.

[11] Patent Number: 4,642,381

[45] Date of Patent: * Feb. 10, 1987

[54] CATALYST AND METHOD FOR PRODUCTION OF METHYLAMINES

[75] Inventors: Kamil Klier, Bethlehem; Richard G. Herman, Whitehall; Gamini A. Vedage, Bethlehem, all of Pa.

[73] Assignee: Lehigh University, Bethlehem, Pa.

[*] Notice: The portion of the term of this patent subsequent to Oct. 30, 2001 has been disclaimed.

[21] Appl. No.: 555,579

[22] Filed: Nov. 28, 1983

Related U.S. Application Data

[63] Continuation of Ser. No. 500,037, Jun. 1, 1983, Pat. No. 4,480,131.

[51] Int. Cl.[4] .......................................... C07C 63/111

[52] U.S. Cl. .................................... 564/480; 502/343

[58] Field of Search ......................... 564/480; 502/343

[56] References Cited

U.S. PATENT DOCUMENTS 4,480,131 10/1984 Klier et al. ........................... 564/480

*Primary Examiner*—Paul F. Shaver
*Attorney, Agent, or Firm*—Ratner & Prestia

[57] ABSTRACT

This invention relates to an improved catalyst and method for the selective production of methylamines. More particularly, it is concerned with the preparation of stable highly active catalysts for producing methylamines by a catalytic reaction of ammonia or substituted amines and binary synthesis gas ($CO+H_2$).

10 Claims, No Drawings

CATALYST AND METHOD FOR PRODUCTION OF METHYLAMINES

INTRODUCTION

This is a continuation of application Ser. No. 500,037, filed June 1, 1983, now U.S. Pat. No. 4,480,131.

This invention relates to an improved catalyst and method for the selective production of methylamines. More particularly, it is concerned with the preparation of stable highly active catalysts for producing methylamines by a catalytic reaction of ammonia or substituted amines and binary synthesis gas ($CO+H_2$).

BACKGROUND OF THE INVENTION

The preparation of methylamines of general formula $(CH_3)_n NH_{3-n}$ and $(CH_3)_n NH_{2-n}R$ occurs by the reactions depicted in equations (1) and (2). An example of such process is the preparation of monomethylamine from ammonia and synthesis gas as shown in equation (3).

$$NH_3 + nCO + 2nH_2 \rightarrow (CH_3)_n NH_{3-n} + nH_2O \quad (1)$$

$$NH_2R + nCO + 2nH_2 \rightarrow (CH_3)_n NH_{2-n}R + nH_2O \quad (2)$$

$$NH_3 + CO + 2H_2 \rightarrow CH_3NH_2 + H_2O \quad (3)$$

Methylamines are presently produced by a continuous process with methanol and ammonia using an amorphous silica-alumina catalyst. Even at low methanol conversion efficiencies, such processes are unselective and generally tend to the production of excess trimethylamine over the mono and dimethylamines. Production of maximum amounts of the monomethylamine is achieved when equilibrium is reached at high methanol conversion. However, the relative amounts of the three amine species at equilibrium depend on the methanol to ammonia ratio in the reactant feed stream. At ratios of approximately 1:1 the product contains about 55% ammonia, 12% monomethylamine, 12% dimethylamine, and 22% trimethylamine, on a molar basis (Weigert, U.S. Pat. No. 4,254,061).

Other minerals have been utilized as catalysts for the formation of methylamines by the processes of equation (3). These alternative catalysts however, generally exhibit very poor activity and thus require the use of elevated temperatures resulting in undesirable selectivities. For example, the sodium mordenite of U.S. Pat. No. 4,254,061 describes a reaction of ammonia with methanol at 400° C., 300 psig, and a 1.1 second contact time at 1 atm. These conditions yield a 24% alcohol conversion and a formation of $8.7 \times 10^{-6}$ mol monomethylamine per kilogram of catalyst per hour with a selectivity of monomethylamine/dimethylamine/trimethylamine=86.7/9.3/4.0 mol%.

Various synthetic oxide catalysts containing transition metal ions have been utilized as catalysts for the formation of methylamines from synthesis gas and ammonia. U.S. Pat. No. 3,444,203 describes the reaction of $NH_3/CO/H_2=1.3/1/2$ over a $ZnO/CuO/Cr_2O_3$/Ferrochrome/Binder catalyst at 362° C., 975 psig, and a 2.3 second contact time at one atmosphere which yields a 24% CO conversion (47% to amines and 51% to $CO_2$) to produce 0.72 mol monomethylamine per liter of catalyst per hour. The amine selectivity in this process was monomethylamine/dimethylamine/trimethylamine=64/22/14 mol%, and small amounts of methanol and methane were formed as side-products. Increasing the ammonia to carbon monoxide ratio to 2.6, while maintaining the hydrogen to carbon monoxide ratio at 2:1 gave rise to the formation of 0.52 mol monomethylamine per liter of catalyst per hour with 100% selectivity. Over Zn/Ba/Fe/Al catalysts and Cu/Ba/Fe/Al catalysts, it has been shown that decreasing the ammonia to carbon monoxide ratio leads to the formation of N-alkyl-amines with mainly $C_4$-$C_9$ alkyl groups on the amines but not methyl groups (U.S. Pat. No. 3,726,926).

OBJECTIVES

The primary objective of this invention is to provide a process and catalyst for the preparation of methylamines from ammonia or substituted amines and binary synthesis gas mixtures.

A further object of this invention is to provide a process and catalyst for the preparation of methylamines from ammonia or substituted amines and binary synthesis gas, which provides yields comparable to those known in the prior art at lower temperatures and pressures.

Yet another object is to provide a process and catalyst for the preparation of methylamines in which excess amounts of ammonia are not necessary to obtain very high selectivities for the monomethylated product.

Still another object of this invention is to provide a process and catalyst for the preparation of methylamines by which trimethylamine can be selectively prepared from ammonia and synthesis gas with no traces of higher N-alkylamines being formed.

SUMMARY OF THE INVENTION

The present invention concerns a catalyst and a catalytic process for preparation of methylamines at moderate conditions from synthesis gas and ammonia or substituted amines. The catalytic production process which can be carried out continuously, selectively forms methylamines from feed gas mixtures providing a nitrogen to carbon ratio of 0.1 to 10 over copper/zinc oxide based catalysts. The preparation method of this invention provides yields of monomethylated amines comparable to the prior art under reaction conditions involving appreciably lower temperatures and pressures than observed in the prior art. The method of the present invention also provides very high selectivities to the monomethylated product without requiring excess amounts of ammonia in the feedstream. Further, trimethylamine can be selectively prepared without the production of the higher end alkylamines as in the prior art. In addition, no methane is produced as a side product as is commonly observed with known catalysts.

DETAILED DESCRIPTION OF THE INVENTION

The novel catalysts of this invention that are useful for the methylamine synthesis process $$NH_3 + nCO + 2nH_2 \rightarrow (CH_3)_n NH_{3-n} + nH_2O \quad (1)$$

$$NH_2R + nCO + 2nH_2 \rightarrow (CH_3)_n NH_{2-n}R + NH_2O \quad (2)$$

may involve any composition of Cu/ZnO, but the preferred compositions are in the wt% range of CuO/ZnO=30/70 to 67/33, with the 30/70 wt% composition being the most preferred. These calcined catalysts are then reduced and pelletized. They may also be doped with potassium hydroxide, rubidium hydroxide, or cesium hydroxide under an inert atmosphere so that the alkaline metal ion content is in the range of 0.01 to 1.0 mol% with respect to copper and zinc. Exemplary of the ammonia or amine methylation process is the catalytic preparation of monomethylamine under mild reaction conditions from virtually stoichiometric reactant ratios of ammonia and carbon monoxide. Further, with the novel binary catalyst system, the water gas shift co-reaction of by-product water and carbon monoxide is induced so that hydrogen and carbon dioxide, which are more easily separated from the desired methylamine product, are produced wholly or in part as the final hydrogen and oxygen-containing by-products. If it is desired to decrease the conversion of carbon monoxide to carbon dioxide, the $H_2/CO$ ratio in the reactant gas stream can be increased above the typical 2/1 and the unreacted hydrogen, as well as the unconverted reactant ammonia or amine and carbon dioxide, can be recycled.

The presence of the alkali also provides for avoidance of residual acidity of the catalysts and can lead to better selectivity of methylation.

The catalytic methylation processes of this invention can be carried out in the temperature range of 150°–300° C., the pressure range of 14.7 to 1500 psig, and the gas hourly space velocity (GHSV) range of 500–20,000 liters of feed gas per liter of catalyst per hour measured at STP with a tertiary $NH_3/CO/H_2$ or substituted amine/$CO/H_2$ reactant feed gas. According to the present invention, the nitrogen/CO ratio in the reactants expressed on a molar basis can usefully range from 0.1:1 to about 10:1, but a range of 0.1:1 up to 2:1 is preferred. The $H_2/CO$ ratio can usefully vary from 2:1 to 10:1, but a ratio of 2:1 is typically preferred.

The following examples are illustrative of this invention.

EXAMPLE 1

A $CuO/ZnO=30/70$ mol% catalyst was coprecipitated from a (Cu/Zn) nitrate solution by 1.0M sodium carbonate, filtered, washed, dried, calcined to 350° C., and pelletized to 10–20 Mesh. A 2.45 g (4.8 ml) portion of the dry pelletized solid was diluted with an equal volume of Pyrex beads, centered in the 316 stainless steel reactor, and reduced at 250° C. and ambient pressure with a $H_2/N_2=2/98$ vol% gas mixture. After cooling to ambient temperature, the reaction system was pressurized to 840 psig with hydrogen, and the flow rates of hydrogen and carbon monoxide were adjusted to the desired values with the resultant composition being $H_2/CO=2/1$. The reactor was heated to 120° C., and heated ammonia gas was added to the synthesis gas stream at the top of the reactor. The catalyst was then initially tested at the conditions specified in Table I-A.

TABLE I-A

The Results of the Reaction of Synthesis Gas With Ammonia ($NH_3/CO = 2.1$) over 2.45 g (4.8 ml) of $Cu/ZnO = 30/70$ Catalyst at 300° C., a Pressure of 840 psig, and with GHSV = 1040 hr$^{-1}$

|  | $H_2$ | CO | $CO_2$ | $NH_3$ | $CH_3NH_2$ |
|---|---|---|---|---|---|
| Moles/hr In | 0.0806 | 0.0401 |  | 0.0834 |  |
| Moles/hr Out | a | 0.0382 | 0.0009 | 0.0826 | 0.0009 | aNot determined.

Under these conditions with $NH_3/CO/H_2=40.9/19.6/39.5$, approximately 4% of carbon monoxide was converted in equal proportions to methylamine and carbon dioxide. No methanol was detected in the exit gas, nor were dimethylamine and trimethylamine formed under these experimental conditions.

Maintaining the temperature at 300° C. and the pressure at 840 psig, the flow rate of ammonia was decreased so that the inlet gas stream consisted of $NH_3/CO/H_2=28.2/23.8/47.9$. The results of this test are presented in Table I-B. About 7.2% CO conversion was observed and the yield of monomethylamine was 0.31 mol/l of catalyst/hr. This can be regarded as a minimum yield because this catalyst was pelletized to give a low bulk density of 0.51 g/ml instead of the usual 0.82 g/ml. The monomethylamine yield corresponds to 0.50 mol/kg of catalyst/hr. A trace of dimethylamine was present in the exit stream, but no water or methanol was detected.

TABLE 1-B

The Results of the Reaction of Synthesis Gas With Ammonia ($NH_3/CO = 1.2$) over 2.45 g (4.8 ml) of $Cu/ZnO = 30/70$ Catalyst at 300° C., a Pressure of 840 psig, and with GHSV = 870 hr$^{-1}$

|  | $H_2$ | CO | $CO_2$ | $NH_3$ | $CH_3NH_2$ |
|---|---|---|---|---|---|
| Moles/hr In | 0.0806 | 0.0401 |  | 0.0474 |  |
| Moles/hr Out | a | 0.0372 | 0.0014 | 0.0459 | 0.0015 | aNot Determined

EXAMPLE 2

A 2.45 g (4.8 ml) portion of the $Cu/ZnO=30/70$ catalyst described in Example 1 was prepared for testing using the procedure described in the previous example, but it was tested under different experimental conditions. Using a reactant gas stream consisting of $NH_3/CO/H_2=5.2/31.5/63.3$, the results in Table II were obtained.

TABLE II

The Results of the Reaction of Synthesis Gas With Ammonia ($NH_3/CO = 0.16$) Over 2.45 g (4.8 ml) of $Cu/ZnO = 30/70$ Catalyst at 300° C., a Pressure of 840 psig, and with GHSV = 650 hr$^{-1}$

|  | $H_2$ | CO | $CO_2$ | $NH_3$ | $H_2O$ | $CH_3OH$ | $CH_3NH_2$ | $(CH_3)_2NH$ | $(CH_3)_3N$ |
|---|---|---|---|---|---|---|---|---|---|
| Moles/hr In | 0.0806 | 0.0401 |  | 0.0067 |  |  |  |  |  |
| Moles/hr Out | a | 0.0150 | 0.0107 | 0.0023 | 0.0027 | 0.0013 | 0.00006 | 0.0008 | 0.0042 | aNot Determined

It is evident that about 63% of the CO reactant was converted to products that consisted of carbon dioxide, methanol, monomethylamine, dimethylamaine, and trimethylamine. About 66% of the inlet ammonia was converted to methylated products with a 96.8% selectivity to trimethylamine. No higher alkyl amines, e.g. ethylamine, were found in the exit gas. The yield of trimethylamine corresponded to 0.88 mol/l of catalyst/hr. (1.7 mol/kg. of catalyst/hr.).

EXAMPLE 3

A CuO/ZnO=30/70 catalyst was prepared in the same way as in Example 1, and the calcined powder was pelletized from a thick aqueous slurry. A 2.45 g (3.0 ml) portion of the dry pelletized solid was centered in the reactor and reduced at 250° C. with a $H_2/N_2=2/98$ vol% gas mixture at ambient pressure. After cooling, the reactor was pressurized to 1100 psig with a $H_2/CO=70/30$ vol% synthesis gas. Maintaining a gas flow of GHSV=5000 hr$^{-1}$, the reactor was heated to 225° C. and the isopropylamine was injected continuously into the gas stream as the top of the reactor. The conversion results are given in Table III.

TABLE III

The results of the Reaction of Synthesis Gas Containing $CO/H_2 = 30/70$ vol % at GHSV = 5000 hr$^{-1}$ and a Pressure of 1100 psig with Isopropylamine Over 2.45 g (3.0 ml) of Cu/ZnO (30/70) Catalyst

|  | Temperature | CO | CO$_2$ | H$_2$O | CH$_3$OH | Isopropyl amine | Methyl Isopropyl amine | Dimethyl Isopropyl amine |
|---|---|---|---|---|---|---|---|---|
| Moles/hr In | 225° C. | 0.1840 | | | | 0.0282 | | |
| Moles/hr Out | | 0.1372 | 0.0146 | 0.0009 | 0.0165 | 0.0154 | 0.0101 | 0.0027 |
| Moles/hr In | 190° C. | 0.1840 | | | | 0.0423 | | |
| Moles/hr Out | | 0.1699 | 0.0040 | 0.0003 | 0.0056 | 0.0383 | 0.0040 | 0.0000 |

When the reaction was carried out at 225° C. with a pumping rate of 40 microliters/min (0.0282 mol/hr) of isopropylamine, about 25% of the CO was converted to products and 45% of the primary amine was converted to secondary and tertiary amines with 79% selectivity for the secondary methylisopropylamine. The selectivity is defined as 100×(mol fraction of methylisopropylamine)/(mol fractions of methylisopropylamine plus dimethylisopropylamine). At this temperature, the yield of methylisopropylamine is 3.37 mol/liter of catalyst/hr. At the temperature of 190° C. and with a reactor inlet stream of $(CH_3)_2C(H)NH_2/CO/H_2=6.4/28.1/65.5$, about 10% of the amine reactant was converted to methylisopropylamine with 100% selectivity. No disproportionation of the amine reactant was observed at either temperature.

EXAMPLE 4

A Cu/ZnO—30/70 catalyst was prepared in the same manner as described in Example 3, and the synthesis gas/isopropylamine reaction was carried out under the conditions given in Table IV.

The results summarized in Table IV show that at 215° C. about 82% of the amine was methylated, where half of the amine product was dimethylisopropylamine. At the same time when methylation was occurring, methanol synthesis (but not methane formation) was also observed. It is evident from Table IV that the yield of methylisopropylamine is larger at 215° C. than that at 180° C., indicating that higher temperatures favor higher yields of methylated amines.

What is claimed is:

1. An alkali-containing copper/zinc oxide catalyst useful for the production of methanol consisting essentially of a binary system comprising a mixture of copper metal and zinc oxide prepared by:
   (a) dissolving soluble salts of copper and zinc in an aqueous solution;
   (b) coprecipitating the metal hydroxycarbonates and/or metal hydroxynitrates thereof by addition of a sufficient concentration of an aqueous basic carbonate;
   (c) separating the precipitate, drying, and calcining same to form the equivalent metal oxides;
   (d) reducing the calcined metal oxides in a hydrogen atmosphere substantially to convert copper oxide to lower valence states of copper;
   (e) treating the resulting mixture in an oxygen-free atmosphere with a dilute, aqueous solution of an alkali metal hydroxide or an alkali metal salt; and
   (f) evaporating the moisture in an oxygen-free environment to recover a dried alkali/copper/zinc oxide catalytic material.

2. The catalyst of claim 1, wherein copper nitrate and zinc nitrate are the salts used in step (a).

3. The catalyst of claim 1 wherein the alkali metal introduced is cesium.

4. The catalyst of claim 1, wherein the alkali metal introduced is rubidium.

5. The catalyst of claim 1, wherein the alkali metal introduced is potassium.

TABLE IV

The Results of the Reaction of Synthesis Gas Containing $CO/H_2 = 30/70$ vol % at GHSV = 5000 hr$^{-1}$ and a Pressure of 1100 psig and Isopropylamine Over 2.45 g (3.0 ml) of Cu/ZnO (30/70) Catalyst

|  | Temperature | CO | CO$_2$ | H$_2$O | CH$_3$OH | Isopropyl amine | Methyl Isopropyl amine | Dimethyl Isopropyl amine |
|---|---|---|---|---|---|---|---|---|
| Moles/hr In | 215° C. | 0.1840 | | | | 0.0071 | | |
| Moles/hr Out | | 0.1409 | 0.0094 | 0.0006 | 0.0239 | 0.0013 | 0.0029 | 0.0028 |
| Moles/hr In | 180° C. | 0.1840 | | | | 0.0071 | | |
| Moles/hr Out | | 0.1756 | 0.0016 | 0.0000 | 0.0053 | 0.0058 | 0.0013 | 0.0000 |
| Moles/hr In | 159° C. | 0.1840 | | | | 0.0071 | | |
| Moles/hr Out | | 0.1807 | 0.0007 | 0.0000 | 0.0019 | 0.0066 | 0.0005 | 0.0000 |
| Moles/hr In | 150° C. | 0.1840 | | | | 0.0071 | | |
| Moles/hr Out | | 0.1820 | 0.0002 | 0.0001 | 0.0015 | 0.0068 | 0.0003 | 0.0000 |

6. The catalyst of claim 1, wherein said catalyst includes from 2 to 70 mol% copper and from 30 to 98 mol% zinc oxide.

7. The catalyst of claim 1, wherein said catalyst includes from 0.01 to 1.0 mol% of alkali deposited in and on the surfaces of said catalyst.

8. The catalyst of claim 1, wherein step (e) is carried out with a mixture of alkali metal hydroxides or salts consisting of one or more from the group of cesium, rubidium, and potassium, and one or more from the group of lithium, sodium, potassium, rubidium, and cesium.

9. A method of producing methylamines from binary synthesis gas and ammonia at conditions of 150°–300° C., 14.7–1500 psig and GHSV of 500–20,000 liters of feed gas/liter of catalyst/hour using the catalysts of claim 1 or claim 2 or claim 3 or claim 4 or claim 5 or claim 6 or claim 7 or claim 8.

10. A method of producing methylamines from binary synthesis gas and amines at conditions of 150°–300° C., 14.7–1500 psig and GHSV of 500–20,000 liters of feed gas/liter of catalyst/hour using substituted amines of the general formula $NH_2R$ using the catalysts of claim 1 or claim 2 or claim 3 or claim 4 or claim 5 or claim 6 or claim 7 or claim 8.

* * * * *